United States Patent

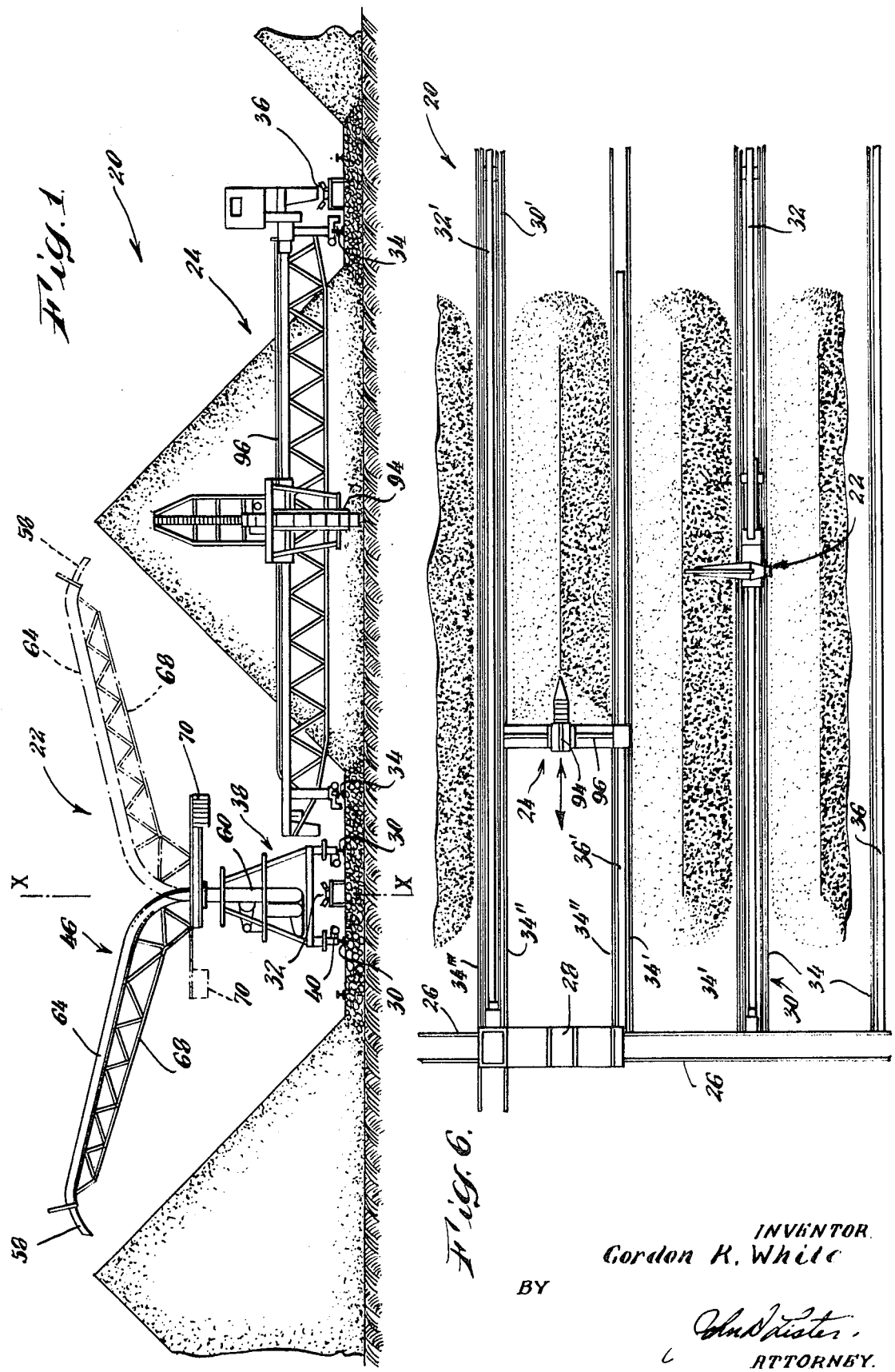

[11] 3,604,757

[72] Inventor Gordon R. White
    Montville, N.J.
[21] Appl. No. 42,699
[22] Filed June 2, 1970
[45] Patented Sept. 14, 1971
[73] Assignee Hewitt-Robins Incorporated
    Montville, N.J.

[54] STACKING AND RECLAIMING SYSTEM
    6 Claims, 6 Drawing Figs.
[52] U.S. Cl. ................................................. 302/13, 302/56, 214/10
[51] Int. Cl. ................................................. B65g 53/04
[50] Field of Search ..................................... 302/11, 12, 13, 56; 214/10

[56] References Cited
    UNITED STATES PATENTS
    3,298,749  1/1967  Croon et al. .................. 302/56
    2,171,528  9/1939  Andrada ....................... 214/10

Primary Examiner—Andres H. Nielsen
Attorneys—John D. Boos and John D. Lister

ABSTRACT: A stacking and reclaiming system for storing wood chips in elongated, substantially homogeneous piles and for reclaiming the wood chips from storage on a first in—first out basis. The traveling stacker is a self-contained pneumatic assembly with the blower, chip feeder, discharge blow pipe assembly and power source all being mounted on the carriage. The traveling stacker is fed from one of a first series stationary endless conveyor belts with a tripper that moves with the stacker effecting the transfer of chips from the particular conveyor belt to the feeder. The traveling reclaimer can be a rotary bucket wheel screw-type or drag-type reclaimer, which deposits the chips onto one of a second series of stationary endless discharge conveyor belts for transport to the next processing station.

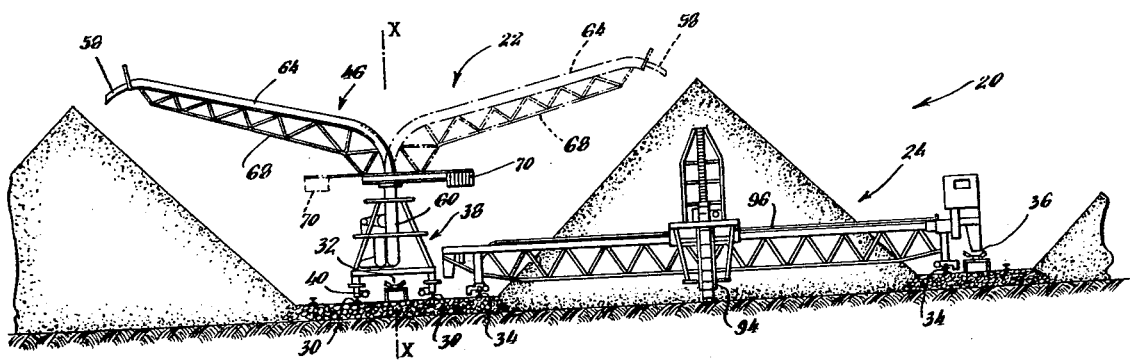

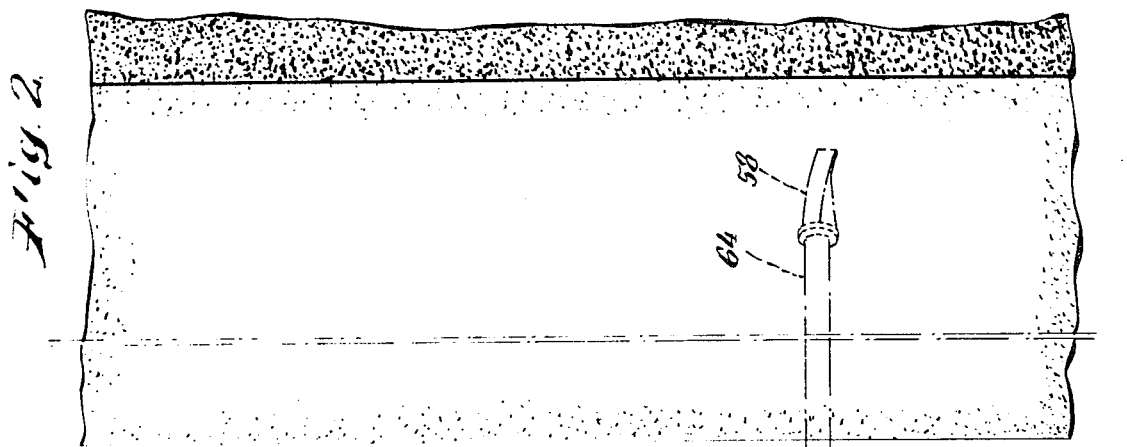
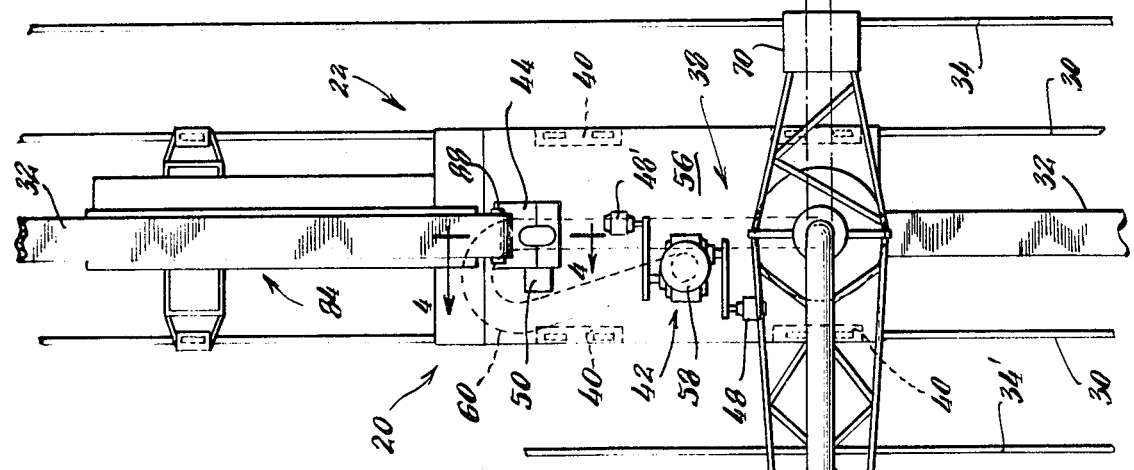
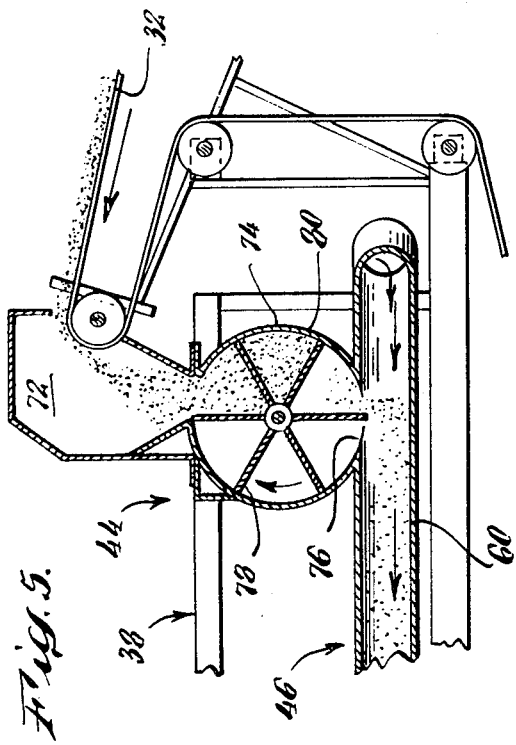
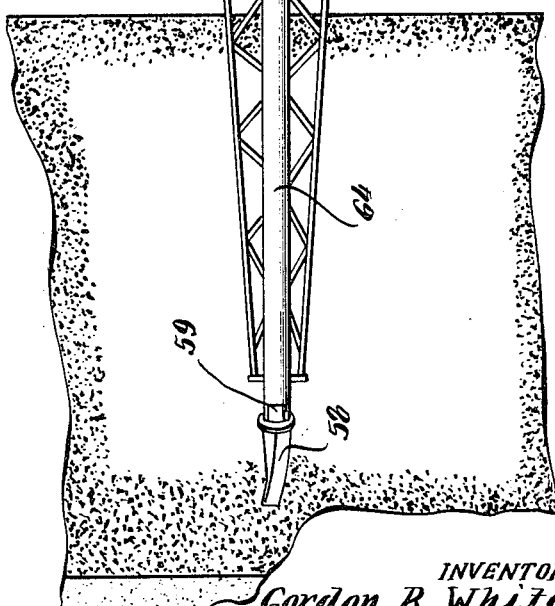

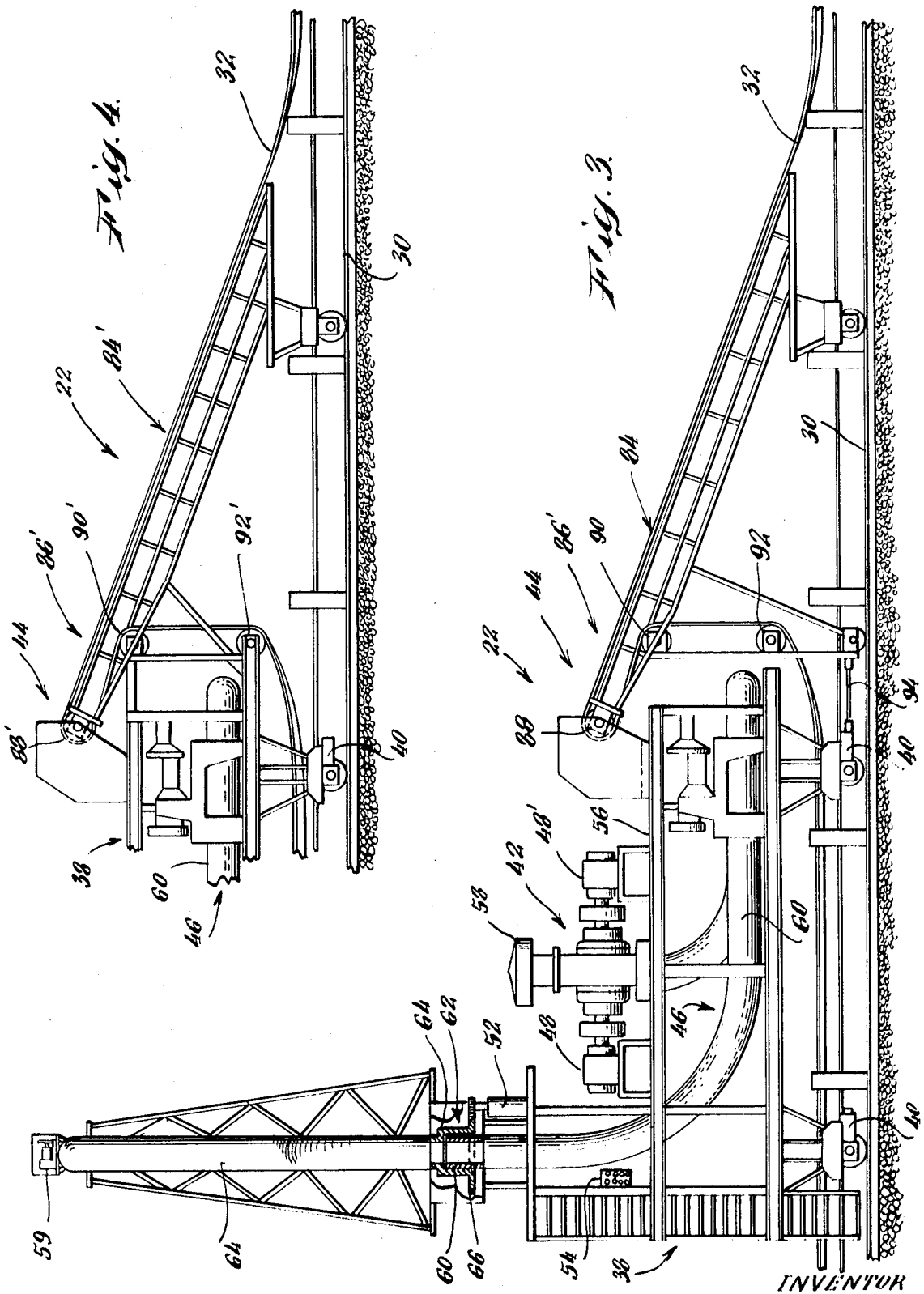

STACKING AND RECLAIMING SYSTEM

BACKGROUND OF THE INVENTION

The present invention relates generally to wood chip storage systems and in particular, to an improved first in—first out wood chip storage and reclaiming system for minimizing the storage period.

Prolonged storage of wood chips can result in substantial wood losses and inferior wood quality due to microbiological and possible organic chemical reactions. Therefore, it is desirable for mills to minimize the storage period for the wood chips while maintaining a sufficient quantity available in case of fluctuations in the wood supply.

It is also desirable to have the compaction and configuration of the storage pile such that there will be a minimum amount of oxygen within the pile so that both microbiological deterioration and the possibility of a chip pile fire may in turn be kept to a minimum.

Consequently, it is an object of the present invention to minimize storage losses by utilizing a first in—first out storage system. This system utilizes a pneumatic conveyance of the wood chips to maintain a satisfactory compaction and enables the chips to be stored in long, narrow, low piles for purposes of reduced deterioration.

Another object of the present invention is to combine the traveling pneumatic stacker with a fixed endless conveyor belt assembly. Due to the ability of the pneumatic stacker to convey material vertically, the length of the trailer which feeds the stacker can be kept at a minimum, thereby enabling the formation of longer piles for better utilization of the storage area.

A further object of the present invention is to provide a storage system wherein the wood chips are transported to, and transported away from, the storage piles by separate conveyor belts. This enables the stacker and reclaimer assemblies to work the same or adjacent wood chip piles without interference.

Another object of the present invention is to provide the pneumatic stacker with a boom, which can be pivoted to either side of the track bed, to facilitate the formation of piles along either side of the track bed.

It is a further object of the present invention to provide a system exhibiting the above characteristics which is durable and easy to maintain.

BRIEF DESCRIPTION OF THE INVENTION

A first in—first out stacking and reclaiming system for storing wood chips and the like in elongated, properly compacted piles utilizes a traveling pneumatic stacker and a rotary bucket wheel, screw type or drag type reclaimer. The traveling pneumatic stacker is a self-contained unit with the blower, wood chip feeder, discharge blow pipe assembly and power source all being mounted on a carriage which is propelled along a predetermined path. The traveling pneumatic stacker is fed from a stationary endless conveyor belt assembly by a tripper that moves with the stacker and effects the transfer of chips from the endless conveyor belt to the feeder. The feeder, in turn, deposits the wood chips into the discharge blow pipe of the stacker downstream from the blower where the chips are picked up by the flow of air in the blow pipe and discharged through the outlet deflector.

Recovery of the wood chips from the elongated piles is effected by a reclaiming assembly which preferably follows the same path as the stacker in a sequence such that the oldest piles formed by the stacker are reclaimed first. The traveling reclaimer, which can be a rotary bucket wheel, screw-type or drag-type reclaimer, recovers the wood chips from the piles and discharges the chips onto a stationary endless discharge conveyor belt for transport to the next processing station. Since the reclaimer travels on its own set of tracks and discharges the wood chips onto its own conveyor belt assembly, the reclaimer and pneumatic stacker can work the same or adjacent storage piles without interfering with the other's operation.

The above objects and advantages of the present invention will become more apparent and other objects and advantages of the present invention will become apparent from the following detailed description when taken in conjunction with the accompanying drawings in which:

FIG. 1 is an elevation of a storage area illustrating a traveling pneumatic stacker, in end view, and a bucket wheel reclaimer;

FIG. 2 is an enlarged plan view of the pneumatic stacker;

FIG. 3 is an enlarged side elevation of the pneumatic stacker taken substantially along lines 3—3 of FIG. 2;

FIG. 4 is a fragmentary side elevation illustrating a modified tripper assembly, which is an integral part of the pneumatic stacker;

FIG. 5 is a sectional view of a feeder for transferring wood chips from the supply belt to the discharge conduit of the stacker; and FIG. 6 is a schematic plan view of a typical wood chip storage yard utilizing the system of the present invention.

DESCRIPTION OF THE PREFERRED EMBODIMENTS

Referring now to the drawings and in particular to FIGS. 1 and 6, a wood chip storage yard is illustrated utilizing the first in—out storage system 20 of the present invention. In the embodiment shown, the unique traveling pneumatic stacker 22 of the present invention is shown with a rotary bucket wheel reclaimer 24 such as the one disclosed in the H. F. Dischinger U.S. Pat. No. 3,069,027 issued Dec. 18, 1962. The disclosure of this patent is hereby incorporated by reference While a rotary bucket wheel reclaimer is illustrated as the recovery apparatus of the system it is to be understood that other conventional reclaimers such as the screw-type or drag-bucket-type reclaimer can be utilized in the unique combination making up the first in—out storage system of the present invention.

As shown in FIG. 6 the first in—out system of the present invention includes convention transfer tracks and carriages 26, 28 at one end of the storage piles for moving either the pneumatic stacker 22 or the bucket wheel reclaimer 24 from one location to another in the storage yard, as required. Intermediate the storage beds and extending perpendicular to the transfer tracks 26 are conveyors and tracks for the stacker 22 and reclaimer 24. Since the wood chips can be discharged from the pneumatic stacker to form piles on either side of the stacker, the tracks 30, 30' and conveyor supply belts 32, 32' for the pneumatic stacker are located intermediate every second storage bed.

The bucket wheel reclaimer straddles the storage bed during the reclaiming operation and consequently the reclaimer tracks 34', 34'', 34''', 34'''' straddle each bed. However, since the wood chips can be discharged from either end of the reclaimer, the discharge conveyors 36, 36' can be located intermediate every second storage bed.

With the above arrangement the supply and discharge conveyors 32, 36 respectively are alternately located between the adjacent wood chip storage beds. Where tracks for carrying both the pneumatic stacker and reclaimer are located between adjacent storage beds the space between the tracks must allow clearance between the end of the reclaimer and the stacker so that they can pass each other when working adjacent wood chip piles. However, where only reclaimer tracks are located intermediate the storage beds, the beds can be located closer together to create additional storage area.

Turning now to the traveling pneumatic stacker 22, in the preferred embodiments illustrated, the unit is self-contained and transported on a self-propelled carriage 38 which traverses tracks 30, 30', etc. The drive for the carriage, as shown, includes conventional commercially available motors 40 which are coupled to the wheels of the carriage through conventional drive trains to effect the movement of the carriage in either direction along the tracks.

The pnuematic system of the stacker includes the blower 42, feeder 44, discharge blow pipe 46, motors 48, 52 and a conventional control system (represented by control box 54)

for actuating and stopping the drive motors of the carriage, conveyor belts and pneumatic system. While the control box 54 is shown mounted on the carriage it is to be understood that the controls can be located at a control station with the stacker being controlled from this station.

The blower or compressor 42 is a conventional unit which is affixed to the platform 56 of the carriage. The inlet of the blower is provided with a conventional air filter and inlet silencer 57 which is commonly utilized on blowers to keep foreign matter out of the blower and the noise level within an acceptable range. In addition the blower is driven through conventional drive trains by motors 48, 48'.

The outlet of the blower 42 is coupled to the discharge blow pipe 46 of the pneumatic system which passes through a feeder station located downstream and terminates in a discharge deflector 58 rotatably carried by the blow pipe for direction the dispensing of the wood chips during the stacking operation. The deflector 58 can be rotated by a conventional ring and pinion drive train, powered by a motor 59 which is controlled from panel 54, or other equivalent drive means. The discharge blow pipe 46 includes one section 60 which extends from the blower outlet to a pivot joint 62 and a boom section 64 which extends from joint 62 to deflector 58. The blow pipe joint 62 can be any one of numerous conventional blow pipe joints which allow relative rotation between the blow pipe sections about the x—x axis. As represented the downstream end of section 60 is received within a complementary enlarged terminal portion of section 62 with suitable bearings and packings being provided to facilitate rotation and prevent pressure losses.

Section 60 is mounted within and rigidly affixed to the carriage 38 while section 64 is affixed to a conventional, commercially available turntable 66 rotatably carried by the carriage and driven by motor 52 through a conventional ring and pinion drive train. The boom section 64 of the blow pipe is braced by truss work 68 and a diametrically opposed counterweight 70 is provided to offset the weight of the boom and thereby reduce the stresses on the turntable coupling 66 as well as the blow pipe joint 62.

As indicated above, the wood chips are introduced into the discharge blow pipe through feeder station 44. In the embodiment illustrated, the feeder station 44 includes an inlet chute 72, which receives the wood chips from the moving conveyor belt 32; an air lock 74 which receives the wood chips from the inlet chute and prevents the loss of air pressure from the pneumatic system; and an outlet 76 for introducing the wood chips directly into the airstream of the discharge blow pipe so that the chips can be picked up by the airstream and conveyed through the blow pipe to the discharge deflector. As illustrated, the air lock comprises a motor driven rotor 78 having blades which slidably engage and cooperate with a housing 80 to deliver the wood chips to the blow pipe and prevent any pressure loss in the system. Note that the blades of the rotor cooperate with the housing, so that at least four blades are in contact with the housing at any given instant and consequently the feeder is always sealed. While one type of air lock has been illustrated, it is to be understood that other types of air locks can be used without departing from the present invention.

The pneumatic stacker is provided with a trailer 84, 84' having a belt tripper, 86, 86' whereby the conveyor belt passes around pulleys 88, 90 and 92 to effect both the discharge of chips from the belt into the chute and the guidance of the belt through the carriage 38. In the embodiment illustrated in FIG. 3, the trailer 84 is coupled to the stacker by a conventional coupling such as coupling 94 which is a coupling commonly used to interconnect railroad cars. With such a coupling the trailer can be readily uncoupled from the stacker so that the stacker can be transferred to another track to commence the formation of a new pile. In the embodiment illustrated in FIG. 4, the components of the tripper 88', 90', 92' are identical to those of the tripper illustrated in FIG. 3. However, rather than being releasably coupled to the stacker, trailer 84' is affixed to the stacker. With this embodiment the stacker is restricted to a two-pile storage system.

OPERATION

The wood chip yard is made up of a series of elongated properly compacted piles which are formed by the traveling pneumatic stacker and recovered by a rotary bucket wheel reclaimer or the like. The wood chips are transported to the pneumatic stacker 22, from a railroad, port or other supply facility (not shown) by one of the supply conveyors 32, 32', etc. After passing through the air lock of the feeder 44 the chips are introduced into the discharge blow pipe 46 where they are picked up by the airstream and discharged through deflector 58 onto the wood chip bed or pile. As shown, the deflector 58 can be directed from side to side as desired to obtain the correct pile formation and the entire boom 64 can be rotated through a 180° arc so that the stacker can form wood chip piles on either side of the track bed. Once a pile has been completed the boom can be rotated to the other side of the track bed to commence the formation of another wood chip pile or the stacker can be uncoupled from the trailer and transferred to a different track.

The reclaimer normally follows the path of the stacker reclaiming the piles in the same order as the piles were deposited. With the separate tracks and discharge conveyor 36 the reclaimer can work on the same pile that the stacker is currently forming. However, due to the need for maintaining a certain reserve in storage this would not occur under normal operating conditions. The preferred rotary bucket wheel functions in the manner set forth in the above identified patent, recovering material from the face of the pile and depositing the material onto a transverse conveyor belt 96 which in turn deposits the material on one of the discharge conveyors 36 leading to the next operating station (not shown).

While a preferred form of the invention has been shown and described, it is to be understood that modifications and equivalents can be resorted to without departing from the spirit and scope of the present invention as defined in the claims.

What is claimed is:

1. A mobile pneumatic stacking assembly for forming elongated storage piles of wood chips and the like comprising:
    carriage means;
    means for propelling and guiding said carriage means along a predetermined linear path;
    pneumatic conveying means carried on said carriage means; said pneumatic conveying means comprising discharge conduit means for conveying, elevating and discharging wood chips; said discharge conduit means having boom means which is rotatably carried on said carriage means to permit the discharge of wood chips on either side of said stacking assembly; said pneumatic conveying means having air compressor means coupled to said discharge conduit means to provide compressed air for carrying wood chips through said discharge conduit means; said pneumatic conveying means having feeder means coupled to said discharge conduit means and provided with air lock means for receiving wood chips from a conveyor belt and depositing the wood chips into said discharge conduit means; said feeder means being located intermediate said air compressor means and a steeply inclined portion of said discharge conduit means whereby wood chips can be conveyed in a substantially vertical direction after being deposited into said discharge conduit means;
    stationary, endless belt conveyor means for feeding wood chips to said feeder means of said mobile pneumatic stacking assembly as said stacking assembly moves along its predetermined linear path; and
    tripper means for effecting the transfer of wood chips from said endless belt conveyor means to said feeder means; said tripper means connected to and moving with said carriage means.

2. In the mobile pneumatic stacking assembly of claim 1, said discharge conduit means having an outlet provided with deflector means which is rotatably carried on said discharge conduit means to direct the discharge of wood chips from said outlet.

3. In the mobile pneumatic stacking assembly of claim 1, said tripper means being releasably coupled to said carriage means to permit transfer of said mobile pneumatic stacking assembly from a first stationary, endless belt conveyor means to a second stationary, endless belt conveyor means.

4. A stacking and reclaiming system for forming elongated storage piles of wood chips and the like and for reclaiming the same from the storage piles so that the wood chips in storage the longest can be reclaimed first, comprising:

carriage means; means for propelling and guiding said carriage means along a first series of linear tracks so that said stacking means follows predetermined linear courses; pneumatic conveying means for conveying, elevating and discharging wood chips; said discharge conduit means having boom means which is rotatably carried on said carriage means to permit the discharge of wood chips on either side of said stacking means; said pneumatic conveying means having air compressor means coupled to said discharge conduit means to provide compressed air for carrying wood chips through said discharge conduit means; said pneumatic conveying means having feeder means coupled to said discharge conduit means and provided with air lock means for receiving wood chips from a conveyor belt and depositing the wood chips into said discharge conduit means; said feeder means being located intermediate said air compressor means and a steeply inclined portion of said discharge conduit means whereby wood chips can be conveyed in a substantially vertical direction in said conduit means; a first series of stationary, endless belt conveyor means for feeding wood chips to said feeder means of said mobile pneumatic stacking assembly as said stacking means moves along said first series of linear tracks; and tripper means for effecting the transfer of wood chips from said endless belt conveyor means to said feeder means; said tripper means connected to and moving with said carriage means;

reclaimer means, said reclaimer means being independently propelled and guided on a second series of linear tracks to follow the predetermined linear courses of said traveling pneumatic stacking means to thereby effect the recovery of wood chips from the storage piles on a first in—first out basis, a second series of stationary endless belt conveyors for removing wood chips from said reclaimer means; and transfer means for transferring said stacking means and said reclaimer means between said tracks.

5. In the stacking and reclaiming system of claim 4, said discharge conduit means having an outlet provided with deflector means which is rotatably carried on said discharge conduit means to direct the discharge of wood chips from said outlet.

6. In the stacking and reclaiming system of claim 4, said tripper means being releasably coupled to said carriage means.